United States Patent [19]
Wang et al.

[11] Patent Number: 5,256,299
[45] Date of Patent: * Oct. 26, 1993

[54] METHOD AND APPARATUS FOR LIQUID TREATMENT

[75] Inventors: Lawrence K. Wang, Latham, N.Y.; Lubomyr Kurylko, New Providence, N.J.

[73] Assignee: International Environmental Systems, Inc., USA, Latham, N.Y.

[*] Notice: The portion of the term of this patent subsequent to Nov. 8, 2007 has been disclaimed.

[21] Appl. No.: 547,505

[22] Filed: Jul. 2, 1990

[51] Int. Cl.$^5$ ............................................. C02F 9/00
[52] U.S. Cl. ................................... 210/664; 210/669; 210/694; 210/804; 210/805; 210/108; 210/195.1; 210/221.2; 210/257.1; 210/259; 210/266; 210/275
[58] Field of Search .................. 55/74; 210/662–669, 210/678, 694, 703–707, 743, 760, 793, 804–807, 195.1, 221.2, 257.1, 258, 259, 264, 266, 275, 900, 108, 140, 143

[56] References Cited

U.S. PATENT DOCUMENTS

| | | | |
|---|---|---|---|
| 2,302,450 | 11/1942 | Laughlin | 210/275 |
| 3,870,033 | 3/1975 | Faylor et al. | 210/900 |
| 3,985,648 | 10/1976 | Casolo | 210/686 |
| 4,193,869 | 3/1980 | Brucker et al. | 210/705 |
| 4,377,485 | 3/1983 | Krofta | 210/704 |
| 4,548,716 | 10/1985 | Boeve | 210/900 |

OTHER PUBLICATIONS

Public Works (Dec. 1984) by R. P. O'Brien and M. H. Stenzel.
Journal American Water Works Association, (Jun. 1982) by M. Krofta and L. K. Wang.
Proc. of the 44th Ind. Waste Conf. (pp. 505–515, May 1990) by L. K. Wang and M. H. S. Wang.

*Primary Examiner*—Ivars Cintins

[57] ABSTRACT

An improved method and apparatus for purifying liquid in a square or rectangular tank involving ultra violet (UV) treatment, oxidation, flotation, filtration, effluent purging and disinfection is described. The liquid to be treated is fed into the mixing chamber of the apparatus in the presence of UV light and an oxident (ozone and/or hydrogen peroxide), and then discharged into the flotation chamber for gas stripping of volatile organic compounds (VOC) and flotation removal of floating substances. The subnatant in flotation chamber flows downward through multiple automatic backwash liquid phase granular activated carbon (GAC) filters for final polishing before being discharged as the liquid effluent or further disinfected. The flotation chamber is hooded for collection of gas stream which is moved by a gas mover and purified by a gas phase granular activated carbon (GAC) filter. The gas effluent from said gas phase GAC filter is recycled to said flotation chamber for reproduction of gas bubbles, and elimination of secondary air pollution. The multiple liquid phase GAC filters when dirty are backwashed by backwash means comprising a backwash hood, mechanical gears, backwash pump(s), solid-liquid separators, and control means which are mounted on a moving carriage. During backwash, the backwash hood which has identical shape of a liquid phase GAC filter sits on the top of a liquid phase GAC filter, and the liquid phase GAC is suspended and washed by backwash pump(s) using clean water. The dirty backwash wastewater is recycled to the intake header for water treatment thus eliminating secondary water pollution. The floating substances on the liquid surface of said flotation chamber are skimmed off by a removal mechanism for disposal as the waste sludge. The liquid phase GAC when its regeneration is due is pumped out from a liquid phase GAC fiter as a slurry by said backwash pump(s), and is separated by a solid-liquid separator for regeneration. A built-in purge system recycles a portion of said liquid phase GAC filter effluent for repeated treatment during filter backwash, thus upgrading the effluent quality.

3 Claims, 2 Drawing Sheets

METHOD AND APPARATUS FOR LIQUID TREATMENT

BACKGROUND OF THE INVENTION

The present invention relates to a process system and apparatus for treating contaminated liquid to remove volatile organic compounds (VOCs) and other objectionable contaminants from said contaminated liquid, such as contaminated groundwater, surface water, or process water.

Groundwater contamination has been frequently caused by chemical spills, run-off of agricultural herbicides and pesticides, and leakage from sanitary landfills, surface impondments, or underground storage tanks (UST). Groundwater treatment for decontamination becomes an urgent task because half the U.S. population depends on groundwater for their drinking water supply. By the year 2000, the nation's total groundwater demand will double.

Another half the U.S. population depends on surface water (lake water, reservoir water, river water, etc.) of which 50 percent has been protected by communities as their source of drinking water supply, and the remaining 50 percent has been severely polluted by industrial effluents, septic tank effluents and accidental chemical spills. There has been an increasing trend for the nation's population. The higher the population, the higher the water demand. The polluted surface water should be purified not only for environmental conservation, but also for developing more available drinking water sources in the future.

Various industrial process waters containing harmful or even hazardous substances must be properly pretreated for resource recovery or pollution load reduction before being discharged to municipal sewers or receiving waters.

Many conventional unit processes, such as chemical coagulation, flocculation, oxidation, sedimentation clarification, flotation clarification, air stripping tower, granular activated carbon filtration, sand filtration, ozonation, ultra violet (UV) light treatment, chlorination, reverse osmosis (RO), ultrafiltration, microfiltration, ion exchange, distillation, etc. are now available for water purification. Each unit process can only partially purify a contaminated water. In general a feasible water treatment system involving the use of several unit processes is required to accomplish the government required water quality goal, and such a feasible water treatment system is custom designed by a consulting engineer and is usually expensive.

A typical water treatment system being seriously considered by the engineers for groundwater decontamination in New Jersey at a liquid flow rate of 150 gallons per minute includes a pretreatment unit, two air stripping units, a liquid phase granular activated carbon (GAC) polishing filter, and a storage disinfection holding tank. Besides, a gas phase GAC filter with an air flow capacity of 1100 standard cubic foot per minute is required for air emission control. The contractor quoted price in 1989 including equipment, piping, design and installation approached U.S. $500,000, which was only affordable by a government agency. In addition to the high cost, there are possibilities to have secondary air pollution and secondary water pollution. The effluent from the gas phase GAC filter is subject to air emission monitoring in order to comply with very stringent air quality standards, while the wastewaters from the pretreatment unit and the liquid phase GAC filter are subject to wastewater monitoring in order to comply with stringent water quality standards. The long-time operation, maintenance, monitoring and reporting for a typical groundwater decontamination project are very costly, and the engineers decide not to continue the project if their system can not decontaminate the groundwater within 5 months.

To save about ⅔ of costs in equipment, design, and installation of a water treatment system and to totally eliminate secondary air pollution and secondary water pollution for possible wide adoption by industry, communities, or individual property owners, the conventional water treatment technologies must be optimized and packaged. Optimizing and packaging feasible unit processes to form a system or apparatus for more efficient and more cost-effective treatment of any contaminated water are the primary objectives of the present invention. The secondary objective of the present invention is to eliminate secondary air pollution and secondary water pollution.

DESCRIPTION OF PRIOR ART

None of prior arts by Krofta (U.S. Pat. Nos. 3,307,701, 4,022,696, 4,184,967, 4;377,485, 4,626,345 and 4,673,496), Parlette (U.S. Pat. No. 3,820,659), Love et al (U.S. Pat. No. 4,303,517), and Ying et al (U.S. Pat. No. 4,623,464) is feasible for removal of volatile organic compounds (VOCs) from a contaminated liquid, but all of said prior arts cause secondary air pollution and/or secondary water pollution.

Ultraviolet (UV) treatment, ozonation, peroxide treatment, air stripping, dissolved air flotation (DAF) and granular activated carbon (GAC) adsorption are effective unit processes. Laboratory experiments demonstrate that each of the following process combinations more than triple their individual treatment efficiencies:

UV and ozonation
UV and hydrogen peroxide
Air stripping and GAC
Ozonation and GAC
Air stripping and DAF
Flotation aid in DAF
Ozone in stripping
Ozone in DAF
Flotation and filtration Accordingly, the most efficient as well as most cost-effective process system for removing toxic organic and inorganic contaminants will be a simple package system involving the use of all or most of the aforementioned process combinations.

There are only two types of conventional GAC reactors: upflow packed GAC bed and downflow packed GAC bed. Conventional GAC filters are not automatically backwashed, and have problems for regeneration prepreation.

All said prior arts searched adopt circular tanks as their treatment apparatus and do not have adequate effluent purge system. The present invention adopts square or rectangular tanks for process simplification and cost-saving. Besides the present invention has the provisions for elimination of air pollution, elimination of water pollution, purging and upgrading filter effluent, spent GAC collection for regeneration, water recycle, GAC recycle, automatic backwash of GAC beds, multiple filter media selection, etc.

SUMMARY OF THE INVENTION

In accordance with the present invention an improved process system and apparatus for purifying contaminated groundwater, surface water and process water containing volatile organic compounds (VOCs) and other toxic organics or inorganics comprises the following steps:

(a) feeding the contaminated liquid by either gravity or a pump into the inlet of said process system;

(b) treating said contaminated liquid entering the inlet by ultra violet light (UV), an oxident (ozone or hydrogen peroxide or potassium permanganate) and a flotation aid in a mixing chamber for predisinfection, VOC reduction, flocculation and oxidation;

(c) discharging the mixing chamber effluent into a flotation chamber where the mixing chamber effluent is gas stripped for VOC and surfactant reduction by coarse gas bubbles, and for suspended solids and oil reduction by fine gas bubbles;

(d) discharging the flotation chamber effluent downward through the multiple automatic backwash liquid phase GAC filters containing granular activated carbon (GAC) where residual organic and inorganic contaminants are removed;

(e) monitoring and treating the liquid phase GAC filter effluent in a holding and storage chamber by pH adjustment chemical, corrosion control chemical, dry solid calcium hypochlorite, to produce a process system effluent which is suitable for potable consumption;

(f) removing the floating oily substances, surface active substances, and suspended solids from the liquid surface of said flotation chamber by the skimming means;

(g) collecting the air effluent from the top of said flotation chamber in a gas hood and ducting system by an air mover, or air blower;

(h) purifying said air effluent for removal of VOC and others with a gas phase GAC filter;

(i) eliminating secondary air pollution by recycling the gas phase GAC filter effluent to said flotation chamber for reproduction of gas bubbles;

(j) backwashing the liquid phase GAC filters, one filter at a time, by a backwash means comprising a backwash hood, backwash pump(s), a timer control, a mechanical gear system, solid-water separators, hydraulic headloss control, and a manual override, mounted on a moving carriage;

(k) eliminating secondary water pollution by recycling the backwash wastewater (from washing the liquid phase GAC filters) to the inlet header of said process system for repeated water treatment;

(l) pumping the spent liquid phase GAC out by said backwash pump(s) when regeneration of said liquid phase GAC is due, from a liquid phase GAC filter as a slurry and separating said liquid phase GAC from said slurry with solid-liquid separators;

(m) discharging the separated spent liquid phase GAC to a regeneration means for regeneration;

(n) recycling the separated liquid from said solid-liquid separators to said flotation chamber or the inlet for repeated water treatment; and (o) purging a portion of the liquid phase GAC filter effluent for repeated water treatment after backwash, thus upgrading the quality of the purified effluent liquid.

Another improved method of this invention for purifying the emitted gaseous effluent from a flotation chamber having VOCs therein comprises the following steps:

(a) collecting the air effluent from the top of said flotation chamber in a gas hood and ducting system by an air mover, or air blower;

(b) purifying said air effluent for removal of VOC and others with gas phase GAC filter beds; and (c) eliminating secondary air pollution by recycling the gas phase GAC filter effluent to said flotation chamber for reproduction of gas bubbles.

Still another improved automatic backwash liquid phase GAC filter comprises following:

(a) dividing liquid phase GAC filters into multiple bed cells with partition walls having flanges on the top;

(b) supporting all liquid phase GAC filters with a common porous underdrain filter bottom made of stainless steel, alloy, ceramic material, plastic materials, other natural or man-made materials or combinations thereof;

(c) providing a common clear well underneath said porous underdrain filter bottom;

(d) providing a motor-driven moving carriage which travels horizontally on rail to reach every liquid phase GAC filter;

(e) mounting on said moving carriage a backwash hood having identical shape of a liquid phase GAC filter and a flanged bottom with flexible sealing material to cover the top of a liquid phase GAC filter along with flanged partition walls;

(f) mounting on said moving carriage a mechanical gear system to gear said backwash hood down during GAC filter backwash and to gear said backwash hood up during traveling of said moving carriage to another liquid phase GAC filter;

(g) mounting on said moving carriage one or more backwash pumps to suck and suspend said liquid phase GAC for backwash;

(h) mounting on said moving carriage one or more solid-liquid separators to separate said liquid phase GAC from the backwash wastewater for recycling to liquid phase GAC filters and recycling the remaining liquid to the inlet; and (i) providing the timer control, hydraulic head loss control, water level sensors, manual override for operation of said automatic backwash liquid phase GAC filters.

Another improved automatic backwash liquid phase GAC filter is identical to the above liquid phase GAC filter except the following items (c) and (g):

(c) providing a clear well underneath each said porous underdrain filter bottom, and providing a port inside of said clear well for communication between said clear well and said holding and storage chamber; and (g) mounting on said moving carriage one or more pairs of backwash pumps to suspend GAC medium for backwash during which one of the pair provides pressurization at said port and another of the pair provides suction inside of said backwash hood.

Still an improved method for transporting liquid phase GAC medium in an automatic backwash multiple liquid phase GAC filter system for GAC regeneration therein comprises the following:

(a) pumping the spent liquid pahse GAC out when GAC regeneration is due by said backwash pump(s) from an automatic backwash liquid phase GAC filter as a slurry to a solid-liquid separator;

(b) separating said spent liquid phase GAC from the slurry with said solid-liquid separator;

(c) discharging the separated spent GAC to an on-site regeneration means or an off-site regeneration means; and (d) recycling the separated liquid from said solid-liquid separator to the inlet for repeated water treatment.

DESCRIPTION OF THE PREFERRED EMBODIMENT

Figure 1:
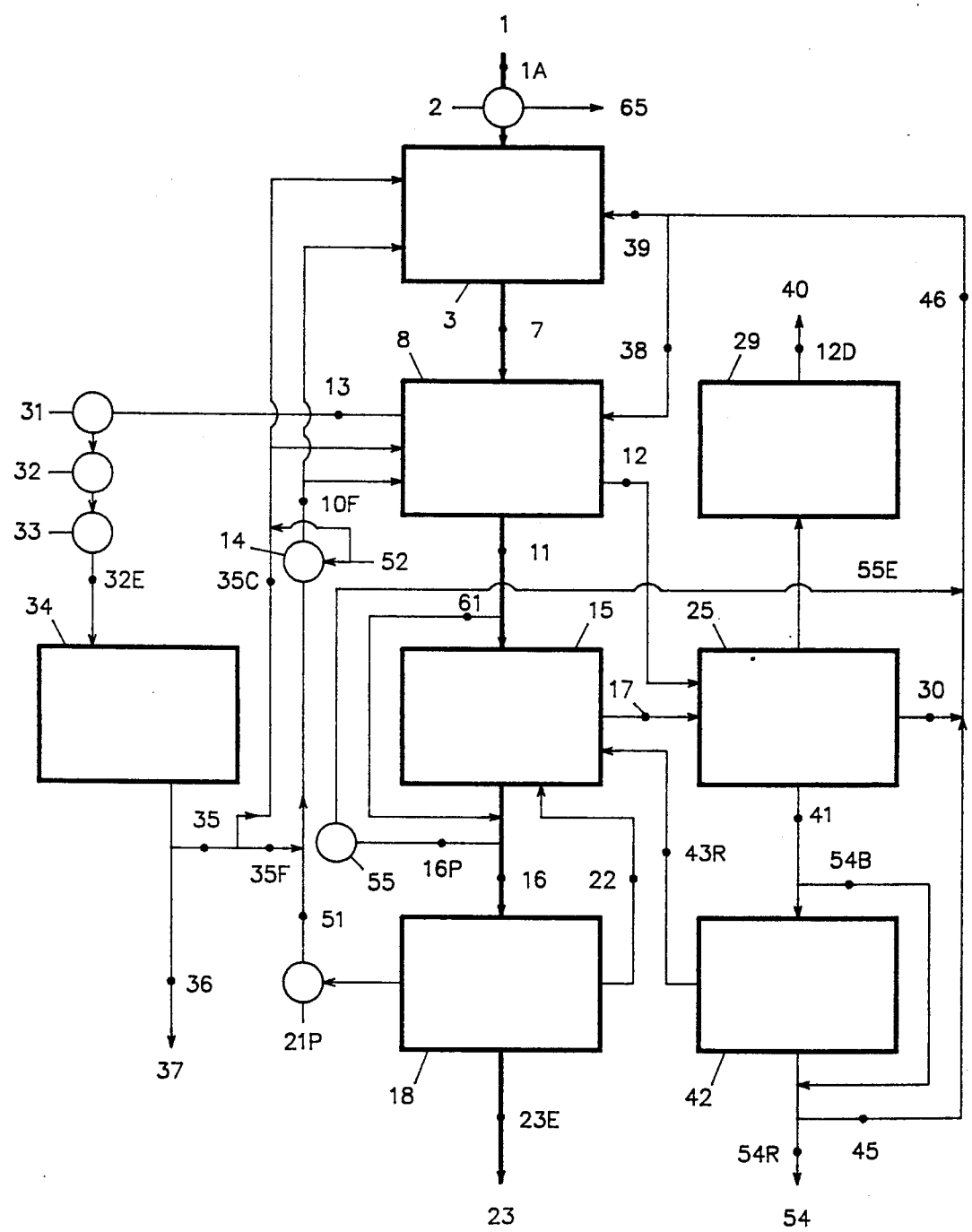
FIG. 1 is a flow diagram of an improved process system for liquid treatment with special emphasis on purification of groundwater containing volatile organic compounds (VOCs).
Figure 2:
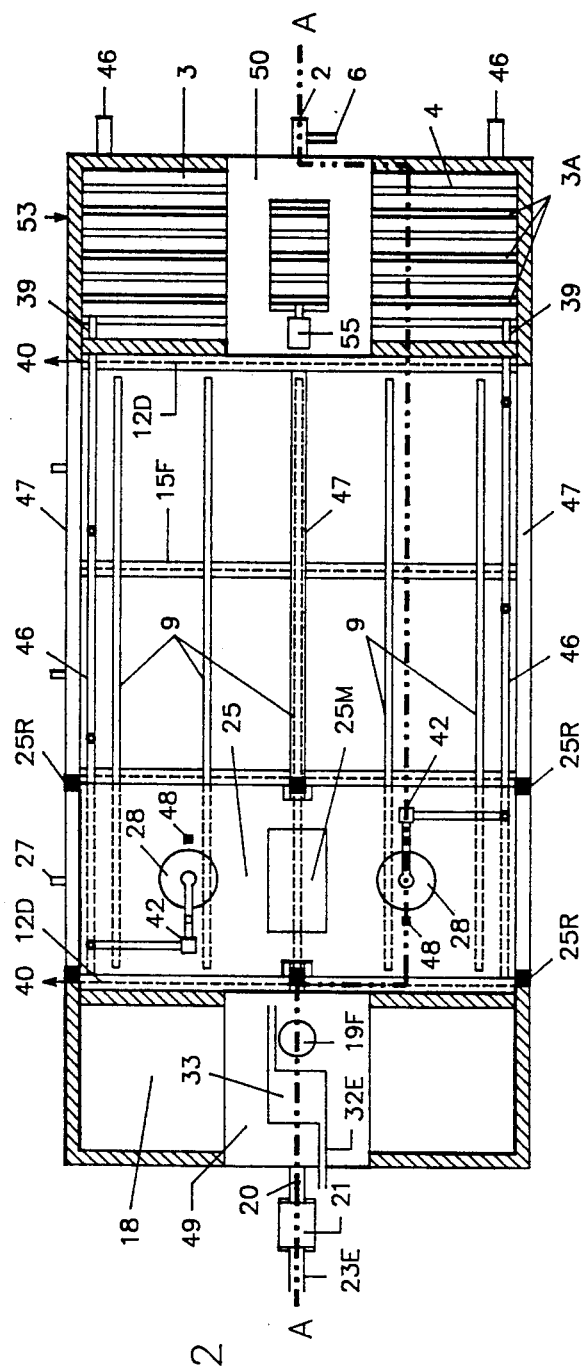
FIG. 2 is a diagrammatic top view showing generally perspective view of the preferred apparatus in accordance with the invention.
Figure 3:
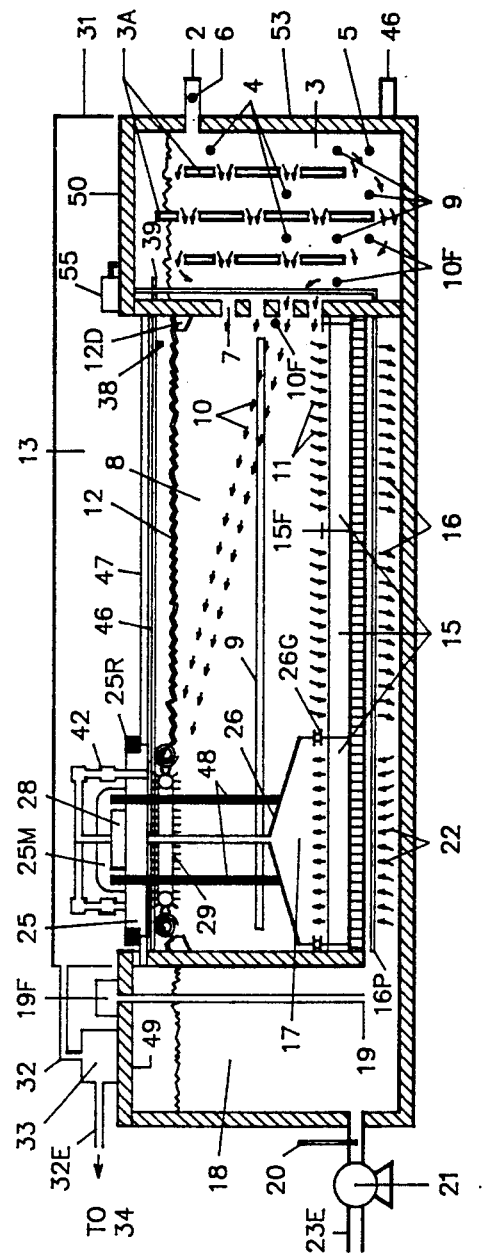
FIG. 3 is a diagrammatic side view showing generally the portion of FIG. 2 indicated by the cut-off line marked A—A. This figure also illustrates water currents and directions in the body of the water in the improved liquid treatment apparatus during backwash of one section of multiple automatic backwash granular activated carbon (GAC) filter beds.

Referring to the drawings there are shown in FIGS. 1, 2 and 3 for purifying liquid in which the VOCs, suspended solids, colloidal substances, surface active agents, living microorganisms, heavy metals, and other organic and inorganic contaminants are removed by means of a combination of ultraviolet (UV), oxidation (using ozone, or hydrogen peroxide, or potassium permanganate), dispersed gas flotation, dissolved gas flotation, and granular activated carbon (GAC) filtration.

The improved process system shown in FIGS. 1 and 3 includes the main process steps of mixing 3, UV 4, oxidation 5, chemical feeding 6, dispersed gas flotation with coarse gas bubbles for gas stripping 9, dissolved gas flotation with fine gas bubbles for flotation clarification 10, automatic backwash liquid phase GAC filtration 15, GAC filter backwash recycle 38, purging 55 a portion of liquid-phase GAC filter effluent for upgrading the overall effluent quality, holding/storage 18 for post-treatment 19 and monitoring 20, solid-liquid separation 42, skimming removal of floating sludges 29, gas phase GAC filtration 34, and gas stream recycle 35. The bold lines 1A, 7, 11, 16 and 23E in FIG. 1 represent the preferred primary liquid treatment train from the contaminated influent 1 to the purified effluent liquid 23. All thin lines in FIG. 1 represent the preferred secondary pollution elimination and resource recovery system.

The improved liquid treatment apparatus shown in FIGS. 2 and 3 incorporates all process steps described in FIG. 1 into one package unit for process simplication, improvement and cost saving.

FIGS. 1, 2 and 3 are used together to describe the preferred primary liquid treatment train, secondary pollution elimination and resource recovery system and related embodiment.

The contaminated influent liquid 1 enters the preferred process system (FIG. 1) and apparatus (FIGS. 2 and 3) at inlet pipe 1A where flotation aid and chemical feed 6 is provided.

Inside of said mixing chamber 3, shown in FIGS. 1–3, the UV light 4, oxidation 5 and flotation aid and chemical feed 6 are provided for liquid pretreatment. Compressed air 52 is injected into said mixing chamber 3 for gas stripping 9 and mixing. The pressurized liquid-gas stream 10F which is produced by a gas dissolving tube 14 with gases from pipe 52 and/or pipe 35 and liquid from pipe 51 is used for fine gas bubbles generation near the exit of mixing chamber 3 or entrance of flotation chamber 8. The mixing chamber effluent 7 enters the flotation chamber 8 where coarse bubbles gas stripping 9 (i.e. dispersed gas flotation) and/or fine bubbles floating 10 (i.e. dissolved gas flotation) takes place.

The flotation chamber effluent 11 flows downward through the multiple automatic backwash liquid phase GAC filters 15, while the floated scums 12 on the liquid surface are removed as the wast sludges 40 by the moving and rotating skimming means 29, through the sludge discharge pipe 12D.

The liquid phase GAC filter effluent 16 flows to a holding and storage chamber 18 where post-treatment 19 (disinfection, pH control, and corrosion control,), effluent monitoring 20 and effluent pumping 21 are provided. The post-treatment chemicals when necessary are fed by feed pumps 19F. The purified effluent liquid 23 is discharged through the effluent pipe 23E.

During the liquid-phase GAC filter backwash 24, a moving carriage 25 which is equipped with a backwash hood 26, backwash pumps 28, solid-liquid separators 42, a mechanical gear system 48, and a control 27 moves to one of liquid phase GAC filter 15 and covers the flanges of said filter bed 15F with flexible sealing means 26G. The backwash pumps 28 suck the clean backwash water 22 upward through said liquid phase GAC filter 15, backwash the liquid phase GAC, produce a liquid stream 17 and discharge the backwash pump effluent 41 to a solid-liquid separator 42.

When the backwash pumps 28 are operated at normal speed for liquid-phase GAC filter backwash, the separated GAC 43 from said solid-liquid separators 42 is in small quantity and returned to the liquid phase GAC filters 15 through the pipe 43R, and the separated liquid 44 is recycled to either said mixing chamber 3 (through the pipes 45, 46 and 39) or said flotation chamber 8 (through the pipes 45, 46 and 38).

When the liquid phase GAC filters 15 are ready to be regenerated, the backwash pumps 28 are operated at an appropriate high speed, for total suspension of the spent GAC in slurry form for transportation of said spent GAC through the pipes 41, 54B and 54R to a storage area to be ready for commerical or in-plant GAC regeneration. The solid-liquid separator 42 is used for GAC-water separation instead of the by-pass line 54B, when desired.

For further removal of VOCs from the emitted gas stream 13, the top of said flotation chamber 8 is covered by a gas hood 31 with a ducting system 32. An air/gas mover 33 sucks the gas stream 13, and discharges said gas stream 13 to a gas phase GAC filter 34 through pipe 32E for purification. The purified gas stream normally is recycled to said flotation chamber 8 for coarse bubbles air/gas stripping 9 through pipe 35C, or for fine bubbles floating 10 through pipe 35F.

A portion of the liquid in said holding/storage chamber 18 is periodically pumped by said effluent pump 21 or a pressure pump 21P to a gas dissolving unit 14 for dissolution of the recycled air/gas 35 and the external air 52, under pressure. The pressurized liquid-gas stream from said gas dissolving unit 14 is released into said flotation chamber 8 through pipes 10F for supply of fine gas bubbles.

There are a platform 50 on the top of said mixing chamber 3, and a platform 49 on the top of said holding/storage chamber 18.

The moving carriage 25 is supported by high-strength rollers 25R on a rail system 47 and driven back and forth horizontally by a gear motor 25M. The rotating sludge skimming means 29 are mounted on and moved along with said moving carriage 25, and can rotate either clockwise or counterclockwise to push the floated sludge 12 into the collection drain pipe 12D.

Also mounted on said moving carriage 25 is the mechanical gear system 48 that gears the backwash hood 26 up during horizontal traveling, or gears the backwash hood 26 down during backwash of a liquid phase GAC filter 15.

Immediately after backwashing one of liquid phase GAC filters, the GAC are not totally settled on the underdrain filter bottom and initial filter effluent quality is poor. Such portion of initial filter effluent is purged by a purge pump 55 (FIGS. 1 and 3) and recycled through pipe 16P for reprocessing, thus upgrading the overall effluent quality. The purged effluent 55E is shown in FIG. 1.

In commercial embodiments of the invention apparatus is provided with square or rectangular tanks of various sizes ranging from 6 to 120 feet in length. The depth of the liquid in the tank 53 is from 3 to 10 feet. Such package tanks are suitable for treating liquid from 25 to 10,000 gallons per minute. The liquid to be purified contains a maximum of 1,000 micrograms per liter of VOC. The combination of UV, oxidation, gas stripping, dissolved gas flotation and GAC achieves 99 percent reduction of VOC or almost non-detectable levels of VOC in the effluent. The adoption of secondary pollution elimination and resource recovery system and an effluent purge system complies with the Federal and State effluent discharge criteria. It is apparent from the preceding description that an improved process system and apparatus has been provided for decontamination and purification of water.

While the invention has been described and illustrated with reference to a specific embodiment thereof, it will be understood that the modification and variations thereof will occur to those skilled in the art, and that the appended claims are intended to cover such modifications and variations which are within the scope and spirit of this invention. The following modifications and variations within the scope and spirit of this invention are cited below:

The method and apparatus of this invention wherein said automatic backwash liquid phase GAC filter is of square or rectangular shape, but the same method can be applied to a circular apparatus adopting similar design and operational procedures.

The liquid phase GAC and the gas phase GAC can be replaced partially or totally by granular activated alumina, polymeric adsorbents, ion exchange resins, coals, sands, greensands, alloy media or combinations thereof.

The mixing chamber of this invention with open top can be totally closed, instead.

Besides, said mixing chamber can be replaced by: (a) an in-line static mixer, an in-line UV-ozone unit and a fine bubbles release means for dissolved gas flotation, instead; or (b) an in-line static mixer, an in-line UV-hydrogen peroxide unit, and a fine bubbles release means for dissolved gas flotation, instead.

Furthermore, said mixing chamber adopts different baffle designs to achieve optimum hydraulic pattern for mixing and energy saving.

The flotation chamber of this invention is a simple dispersed gas flotation chamber using coarse gas bubbles for stripping removal of VOCs and surface active substances, or is a simple dissolved gas flotation chamber using fine gas bubbles for removal of suspended and oily contaminants.

The holding and storage chamber of this invention with open top can be totally covered, and can be equipped with chemical feeder(s) to feed ozone, calcium hypochlorite, sodium hypochlorite or other chemicals. Besides, said holding and storage chamber can be replaced by a separate detached holding and storage tank; while said mixing chamber can also be replaced by a separate detached mixing chamber.

The automatic backwash multiple liquid phase GAC filters of this invention are equipped with a purge system for collecting and reprocessing a portion of filter effluent immediately after backwash, in turn for upgrading the overall effluent quality. The purge system of this invention is equally effective for both rectangular and circular automatic backwash liquid phase GAC filters using filter media selected from a group comprising GAC, granular activated alumina, polymeric adsorbents, ion exchange resins, coals, sands, greensands, alloy media, or combinations thereof.

The skimming means of this invention which is mounted on the moving carriage rotates counterclockwise or clockwise, and travels horizontally.

The skimming means of this invention can also be mounted on said flotation chamber wall or platform and be a non-traveling rotating unit across the full length of said flotation chamber's top.

Alternatively, the flotation chamber can be divided into two separate sections: one section is for dispersed gas flotation using coarse gas bubbles for gas stripping, and another section is for dissolved gas flotation using fine gas bubbles for floating.

The process system and apparatus of this invention, wherein said ozone is replaced or enhanced by hydrogen peroxide, or potassium permanganate.

Alternatively, the process system and apparatus of this invention wherein said skimming means is replaced by rotating scooping means mounted on said moving carriage for removal of floating oily substances, surface active substances and suspended solids.

Alternatively, the process system and apparatus of this invention wherein said mixing chamber can be injected with coarse gas bubbles for both gas stripping and mixing.

Still alternatively, said mixing chamber can be injected with fine gas bubbles near the mixing chamber exit for subsequent dissolved gas flotation in said flotation chamber.

What is claimed is:

1. A process for purifying contaminated ground water, surface water or process water containing volatile organic compounds and toxic substances comprising the following steps:
    (a) feeding the contaminated water by either gravity or a pump into the inlet of a square or rectangular apparatus, containing a baffled mixing chamber;
    (b) treating said contaminated water in said mixing chamber by ultra violet light, ozone, and flotation aids thereby producing a mixing chamber effluent and a first air effluent;

(c) discharging the mixing chamber effluent into a flotation chamber inside said apparatus, removing volatile organic compounds and surfactant from the mixing chamber effluent in said flotation chamber by contacting said mixing chamber effluent with coarse gas bubbles, and removing suspended solids and oil from the mixing chamber effluent in said flotation chamber by contacting said mixing chamber effluent with fine gas bubbles, thereby producing a flotation chamber effluent and a second air effluent;

(d) discharging the flotation chamber effluent downward through multiple automatic backwash granular activated carbon filter cells inside said apparatus thereby removing residual organic and inorganic contaminants from said flotation chamber effluent and producing a filter effluent;

(e) discharging the filter effluent into a holding/storage chamber comprising a chemical feeder means, and feeding disinfection chemical, pH adjustment chemical and corrosion control chemical into said filter effluent, thereby producing a holding/storage chamber effluent;

(f) removing floating oily substances, surface active substances and suspended solids from the water surface of said flotation chamber by a skimming/scooping means mounted on a moving bridge thereby producing waste sludges;

(g) backwashing the granular activated carbon filter cells, one cell at a time, by a backwash means comprising a moving carriage, a backwash hood, backwash pumps, a solid-liquid separator, a mechanical gear system, a timer control, a hydraulic headloss control, and a manual override, thereby producing a backwash wastewater;

(h) recycling the backwash wastewater to the mixing chamber;

(i) collecting the first and second air effluents in a gas hood and ducting system by the power of an air mover;

(j) purifying said collected first and second air effluents by passing said air effluents through a granular activated carbon filter, thereby producing a purified air effluent; and (k) recycling said purified air effluent to said flotation chamber or to said mixing chamber for reproduction of gas bubbles.

2. A flotation-filtration apparatus for purifying a contaminated liquid comprising in combination:

(a) an inlet leading said contaminated liquid to a rectangular mixing chamber of said apparatus, (b) said rectangular mixing chamber connected to said inlet for treating said contaminated liquid, and having the bottom thereof as a portion of an outside wall of said apparatus, (c) a rectangular flotation chamber connected to said mixing chamber with a common wall with openings for purification of the mixing chamber pretreated liquid, having the bottom thereof as a portion of an outside wall of said apparatus, and having a moving carriage positioned on the top, (d) rectangular liquid filters positioned near the bottom of said flotation chamber for downward purification of the flotation clarified liquid and having filter media and multiple filter beds which are divided by partition walls, and supported by a porous underdrain filter bottom, (e) a rectangular clear well compartment over the porous underdrain filter bottom of said liquid filters for collection of filtration purified liquid, (f) an outlet connected to said clear well compartment for discharging said filtration purified liquid, (g) a rectangular holding/storage chamber connected to said outlet, sharing a common solid vertical wall with said flotation chamber, having the bottom thereof as a portion of an inside wall of said apparatus, and comprising a chemical feeder means for purifying said filtration purified liquid, (h) an effluent pipe connected to said holding/storage chamber for discharging the effluent from said holding/storage chamber, (i) means in said mixing chamber for generating gas bubbles and mixing, (j) means in said mixing chamber for generating ultra violet light, (k) means in said mixing chamber for feeding ozone, (l) means in said mixing chamber for feeding flotation aids, (m) means in said flotation chamber for generating coarse gas bubbles to strip and remove volatile organic compounds and surfactants, (n) means in said flotation chamber for generating fine gas bubbles to remove suspended solids and oil, (o) sludge skimming and transporting means mounted on said moving carriage for removing floated oily substances, surface active substances and suspended solids from liquid surface of said flotation chamber, (p) backwashing means mounted on said moving carriage, comprising a rectangular backwash hood, a mechanical gear system, a timer control, a hydraulic head loss control, water level sensors, and a manual override for automatically and periodically backwashing and cleaning of said liquid filters, (q) solid-liquid separator means mounted on said moving carriage for separation of said filter media from the backwash wastewater, (r) driving motors mounted on said moving carriage for operating said mechanical gear system and moving said moving carriage horizontally on the top of said flotation chamber, (s) said moving carriage having a platform supported between the upper portion of the walls of said flotation chamber so as to hold said backwashing means, solid-liquid separator means, sludge skimming and transporting means, and driving motors, (t) means for horizontally moving said moving carriage together with said backwashing means, solid-liquid separation means, sludge skimming and transporting means and driving motors for operating said mechanical gear system, (u) means for eliminating secondary water pollution by recycling the backwash wastewater resulting from washing the liquid filters to the inlet of said apparatus for repeated water treatment, (v) a purge system for purging, collecting and treating a portion of liquid filter effluent after filter backwash for upgrading the overall filter effluent quality, (w) means for purifying the emitted air effluents, comprising: (1) a gas hood and ducting system which is installed on the top of said mixing chamber and said flotation chamber for collecting the air effluent, (2) a gas phase granular activated carbon filter which is connected to said gas hood and ducting system for removing VOCs from said air effluents, and (3) means for eliminating secondary air pollution by recycling the gas phase granular activated carbon filter effluent to said mixing chamber and said flotation chamber for reproduction of gas bubbles, and (x) means for transporting said filter media for regeneration therein comprising the following: (1) a pump for pumping spent filter media out, when regeneration is due, from a liquid filter in a slurry form, (2) a solid-liquid separator means for separating said spent filter media from said slurry, (3) means for discharging the separated spent filter media to a regeneration means for regeneration, and (4) means for recycling the separated liquid from said solid-liquid separator means to the inlet of said mixing chamber for repeated water treatment.

3. The apparatus of claim 2 wherein said filter media is granular activated carbon, granular activated alumina, polymeric adsorbents, ion exchange resins, coals, sands, greensands, alloy media or combinations thereof.

* * * * *